United States Patent [19]

Asik

[11] 4,364,342
[45] Dec. 21, 1982

[54] IGNITION SYSTEM EMPLOYING PLASMA SPRAY

[75] Inventor: Joseph R. Asik, Bloomfield Hills, Mich.

[73] Assignee: Ford Motor Company, Dearborn, Mich.

[21] Appl. No.: 192,666

[22] Filed: Oct. 1, 1980

[51] Int. Cl.³ .................. F02B 17/00; F02B 19/08
[52] U.S. Cl. ........................ 123/143 B; 123/169 R
[58] Field of Search ....... 123/143 B, 169 R, 169 MG, 123/636, 637, 255, 262, 279, 276, 430, 143 A, 144

[56] References Cited

U.S. PATENT DOCUMENTS

| | | | |
|---|---|---|---|
| 1,290,376 | 1/1919 | Shaw | 123/169 R |
| 3,315,650 | 4/1967 | Bishop et al. | 123/32 |
| 3,439,656 | 4/1969 | Hideg | 123/32 |
| 3,696,798 | 10/1972 | Bishop et al. | 123/32 ST |
| 3,842,818 | 10/1974 | Cowell et al. | 123/169 MG |
| 3,842,819 | 10/1974 | Atkins et al. | 123/169 MG |
| 3,908,625 | 9/1975 | Romy | 123/169 R |
| 3,911,307 | 10/1975 | Goto et al. | 313/143 |
| 3,921,605 | 11/1975 | Wyczalek | 123/169 R |
| 3,988,646 | 10/1976 | Atkins et al. | 317/96 |
| 4,071,800 | 1/1978 | Atkins . | |
| 4,198,944 | 4/1980 | Heintzelman | 123/169 R |
| 4,203,393 | 5/1980 | Giardini | 123/143 B |

FOREIGN PATENT DOCUMENTS 163504 6/1958 Switzerland ................ 123/169 R

Primary Examiner—Raymond A. Nelli
Attorney, Agent, or Firm—Joseph W. Malleck; Olin B. Johnson

[57] ABSTRACT

An ignition system for a stratified charge internal combustion engine is disclosed. The engine has at least one combustion chamber and a fuel injection means effective to inject fuel in a conical spray pattern into a predetermined zone of the combustion chamber for establishing a stratified charge. The system has walls dening a plasma ionizing chamber with an outlet orifice, electrical discharge means to apply an electrical charge across the plasma ionizing chamber causing the contents thereof to be shock heated to an ionized condition and released through the outlet orifice as a jet, and means interrupting the outlet orifice to form said plasma jet into a hollow cone and to direct the conical jet into the zone of the injected fuel.

12 Claims, 4 Drawing Figures

IGNITION SYSTEM EMPLOYING PLASMA SPRAY

BACKGROUND OF THE INVENTION

Ignition devices of the kind producing a plasma flame as distinct from conventional arc sparking plugs have typically comprised an ionizing chamber and an orifice in the chamber wall to permit a plasma flame to project out therefrom. Potential energy from a first source is applied across a gap between two electrodes, which gap usually is the width of the chamber. Typically, the potential is insufficient to cause a discharge across the gap unless the chamber is small, thereby restricting the gap. Or, if the discharge does take place, it is insufficient to develop a flame front that effectively burns unless the orifice is very small (see U.S. Pat. Nos. 3,911,307 and 3,921,605). Thus, the prior art has resorted to a third electrode of higher potential to assure a gap discharge. The three electrode devices are illustrated in U.S. Pat. Nos. 3,842,818; 3,842,819; 3,988,646; and 4,071,800.

A need exists in fuel injected stratified charge internal combustion engines for a precisely controlled combustion of the combustible mixture. The flame front must be stable and sustained to withstand the high transfer motion of inducted air which is swirled and squished in a special pattern (see U.S. Pat. Nos. 3,315,650; 3,439,656; and 3,696,798). Plasma ignition devices can be useful to a fuel injected stratified charge engine because the plasma flame front can be more stable and offers the potential for more sustained ignition. However, due to the type of plasma jet emitted by known plasma plugs, the latter is unable to provide complete and desirable combustion in light of the extremely high transfer motion that is taking place within the combustion chamber of a stratified charge engine. It would be desirable if plasma flame ignition systems could be modified to consume the fuel spray pattern more fully, but also to operate with two electrodes which offer greater design freedom and versatility in gap spacings.

SUMMARY OF THE INVENTION

The present invention relates to an ignition system for a stratified charge internal combustion engine, and more particularly to a system employing a plasma jet for igniting a fuel injected air volume. The system has fuel injection means for injecting fuel in a conical spray pattern into a predetermined zone of the combustion chamber for establishing a stratified charge. The system has walls defining a plasma ionizing chamber with an outlet orifice, electrical discharge means is used to apply a high energy electrical discharge across the plasma ionizing chamber, causing the contents thereof to be shock heated to an ionized condition and released through the outlet orifice as a jet. Further, and more important, the system has interrupting means for interrupting the outlet orifice to form the plasma jet into a hollow cone and to direct the latter into the zone of injected fuel.

Preferably, the interrupting means is comprised of an inert conical element having its axis coinciding with the axis of one electrode of the discharge means. The other electrode is preferably spaced from the first electrode a distance along the conical axis by at least 0.100". It is preferable that the axis of the interrupting means and the axis of the conical fuel spray pattern intersect and form an included angle of about 15°–40°, and that the outlet orifice have a diameter of about 0.48–0.52", with said interrupting means being centrally located within said orifice and having a diametrical base of about 0.44–0.48". It is also preferable that the electrical discharge means apply a discharge of at least 200 millijoules for at least two seconds.

Another aspect of this invention is a method for carrying out combustion in a stratified charge internal combustion engine employing at least one sonic plasma spark plug which selectively provides a high energy electrical discharge across a gap between electrodes, one of the electrodes being annular and ringing the other electrode; the engine also employs a fuel injector effective to spray a fuel droplet pattern into the zone to be occupied by a plasma discharge. The method is characterized as follows: (a) axially separating the electrodes of the plug a predetermined distance, (b) interposing an inert guide between said electrodes and within the annular electrode to form a hollow, conically shaped plasma discharge, (c) sending said electrical discharge across said gap to produce said conically shaped plasma discharge, (d) controlling the fuel spray pattern to have a conical fuel pattern complimentary to the conical shape of said plasma discharge, and (e) directing the plasma discharge to intersect and envelope the fuel spray pattern for ignition.

DETAILED DESCRIPTION

Figure 1:
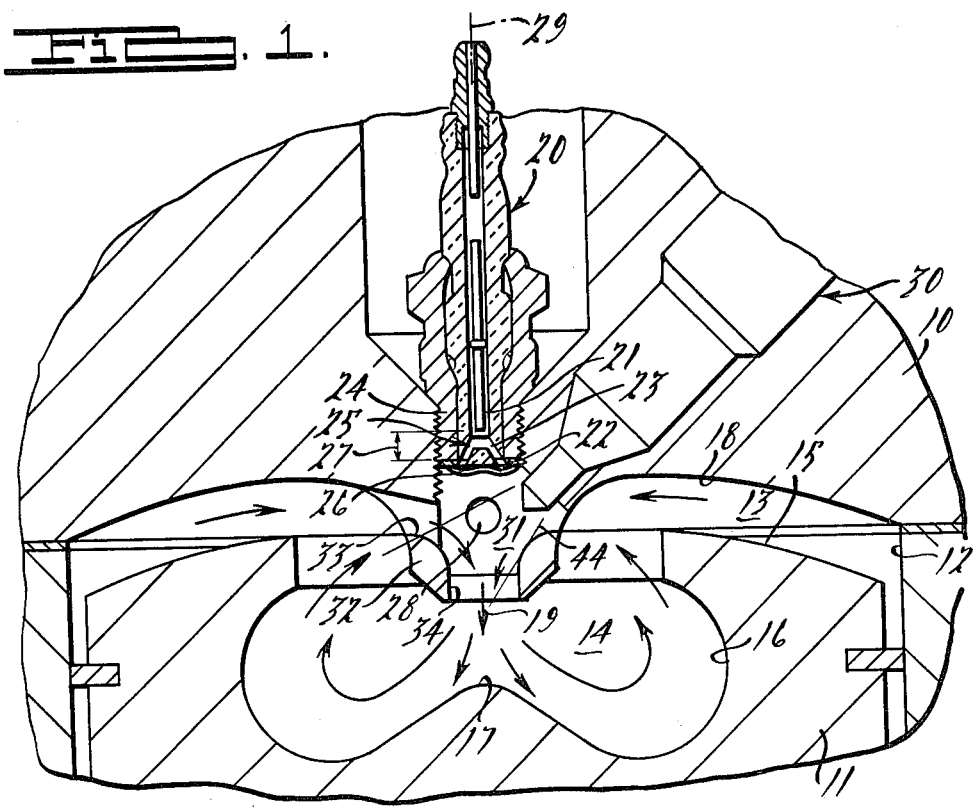
FIG. 1 is a fragmentary sectional view of a portion of a stratified charge internal combustion engine employing a plasma ignition device modified in accordance with the principles of the present invention.
Figures 2, 3:
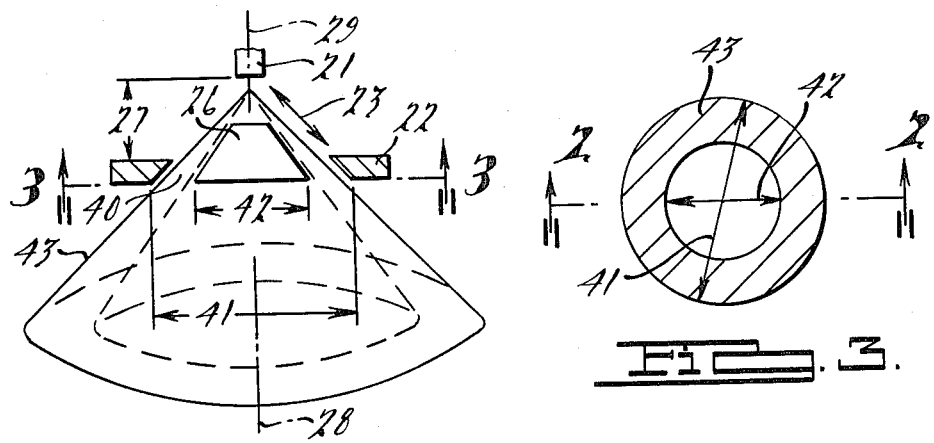
FIG. 2 is a schematic perspective view of the conical plasma pattern emitted by the plasma ignition device of FIG. 1.
FIG. 3 is a sectional view of the pattern of FIG. 2 taken along line 3—3 thereof.
Figure 4:
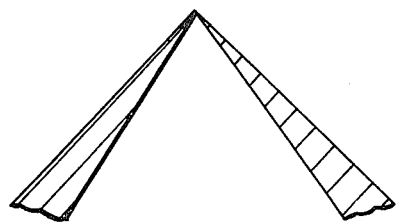
FIG. 4 is a fragmentary sectional view of the view of FIG. 3 taken along the line 2—2 thereof.

Turning now to FIG. 1, there is illustrated a preferred mode for the apparatus of this invention and which view also depicts the steps that must be taken to carry out the method hereof. The stratified charge internal combustion engine 10 may have a plurality of pistons 11 and cylinders 12, one each of which is illustrated here; the piston and cylinder together define a volume space 13 which varies because of the reciprocal motion of the piston.

A main combustion chamber 14 is defined as a cavity within top face 15 of the piston. An induction port (not shown, but illustrated in U.S. Pat. Nos. 3,315,650; 3,439,656; and 3,696,798, each of which is incorporated herein by reference) is offset eccentrically with respect to the main cylinder so that a composite transfer motion is imparted to the inducted air during compression. As a result of such motion, fuel particles injected are slowly dispersed into the air in a manner permitting the control of the air/fuel ratio charge so that a locally rich mixture can be ignited at a selected time to improve combustion with a predetermined degree of crankshaft rotation and before the overall air/fuel ratio becomes too lean.

The main combustion chamber 14 has an undercut sidewall 16 with a raised portion 17 on the bottom thereof acting as a splitter for the air motion directed thereinto. The cylinder head has an interior surface 18 shaped complimentary to the uninterrupted top surface 15 of the piston so that, at or near top dead center, the surface will be closely and uniformly spaced apart a distance of about 0.06–0.1 inches.

There are two vector forces acting on the air within the main combustion chamber during compression, the first of which is circular motion imparted to the air therein as a result of locating the induction port (not shown) eccentric or off-center with respect to the central axis of the cylinder, thereby providing for a general swirling motion which permits the inducted air to move about the cylinder space prior to compression. As the compression stage progresses, the contents of the space 13, trapped between the piston top surface and cylinder head, is urged to move radially inwardly, as shown by the arrows. Such convergence causes the gases to gradually turn and move downward through a central air column 19. As the air column reaches the bottom of the cavity, it is turned outwardly by the splitter to move radially inwardly in all directions along the undercut walls 16 of the main combustion chamber. The combination of a swirling action and the rapid radially inward squish action imparts a toroidal vector to such gases as they enter and move about the piston cavity. This is known as a high airflow transfer motion to be referred to hereinafter, particularly during the later stages of compression.

To ignite the contents of the chamber 14, a plasma plug 20 is used having two electrodes, a central negative electrode 21 and an outer positive ring electrode 22, the latter facing the negative electrode 21 across a discharge gap 23. The plug has an electric insulative member 24 for enclosing the discharge gap so that a plasma ionizing chamber 25 is defined thereby. An outlet orifice 40 from such chamber is provided having an outer diameter 41 defined by the inner diameter of the second electrode which is 0.48–0.52". The orifice is interrupted by a guide member 26 inert to the plasma discharge. The guide member limits the orifice to an annulus having an inner diameter 42 (in the range of 0.44–0.48") defined by the conically shaped guide member 26 placed within said outlet orifice to interrupt same. Because the first electrode is spaced an axial distance 27 from the second electrode (at least 0.100"), and because of the presence of the conically shaped guide 26, the ionized gases within said chamber 25 will be released as a hollow conical plasma jet 43, the axis 28 of such plasma jet being coincident with the axis 29 of the second electrode. The hollow conical plasma jet is oriented preferably to envelope and intersect with the conical pattern of fuel injection, the axes of the jet and fuel pattern intersecting preferably with an included angle of 15°–40°.

The fuel injector 30 may be of the type described in U.S. Pat. No. 3,315,650, particularly column 17, lines 9–58. The fuel injector is oriented to spray a conical pattern 44 of fuel particles into a predetermined zone 31 of the combustion chamber for establishing a stratified charge. Walls 32 of the head define a shock wave intermediate chamber which here defines zone 31. The chamber has openings 33 and 34 aligned with the high transfer motion of the inducted air. Due to the retention of heat by the walls 32 of the intermediate chamber, from previous combustion cycling, the sprayed fuel particles will vaporize more readily upon contact with such walls, facilitating more rapid mixing of the particles as a gaseous fuel mixture.

The over-pressure of the ionized gases within the ionizing chamber causes the ejection of the plasma jet. The plasma will consist of free electrons and ions that are at a high temperature (10,000°–30,000° K.) and are highly energetic and chemically active. The plasma is produced by the shock heating of the contents of the chamber 25, creating a shock wave that is confined by chamber walls 32. The sudden increase in temperature also raises the instantaneous pressure of the partially confined gases, causing a substantial portion of it to be ejected out of the orifice at the bottom end of the plasma cavity preceded by the sonic shock wave.

There are several design parameters for the generation of the sonic plasma jet, the most basic being the cavity dimensions. The cavity here has a minimum diameter of about 0.05 inches. If the cavity is smaller, energy will not be properly discharged. On the other hand, if the cavity diameter exceeds 0.110 inches, plasma jet action may become weak. The applied energy potential is about 3000 volts or greater, with a stored energy of 1.125 joules. The applied potential to the two electrodes is preferably at least 200 millijoules for at least two seconds across the plasma ionizing chamber.

The method of this invention for carrying out combustion within a stratified charge internal combustion engine is as follows. The engine has a piston and cylinder effective to define a main combustion chamber into which an air supply is inducted and has at least one sonic plasma spark plug effective to selectively provide a high energy electrical discharge across a gap between electrodes to induce a plasma discharge, one of the electrodes being annular and ringing the other electrode; the engine also has a fuel injector effective to spray a pattern of comminuted fuel into a zone to be occupied by the plasma discharge. The method comprises:

(a) axially separating the electrodes of the plug a predetermined distance (preferably at least a distance of 0.100");

(b) interposing a guide between said electrodes and within said annular electrode to form a hollow, conically shaped plasma discharge;

(c) sending said electrical discharge across said gap to produce said conically shaped plasma discharge;

(d) controlling the fuel spray pattern to have a conical pattern complimentary to the conical shape of the plasma discharge; and (e) directing the plasma discharge to intersect and envelope the fuel spray pattern for ignition.

Such method is particularly advantageous in a stratified charge engine having high airflow transfer motion as previously described.

I claim:

1. An ignition system for a stratified charge internal combustion engine, said engine having at least one combustion chamber and fuel injection means effective to inject fuel in a conical spray pattern into a predetermined zone of said combustion chamber for establishing a stratified charge, the system comprising:

(a) walls defining an air filled plasma ionizing chamber having an outlet orifice;

(b) electrical discharge means having only two electrodes and being effective to apply a high energy electrical discharge of at least 200 millijoules for at least two seconds across the plasma ionizing chamber causing the contents thereof to be shock heated to an ionized condition and released through said outlet orifice as a jet; and (c) means interrupting said outlet orifice to form said plasma jet into a hollow cone and to direct said hollow conical jet into said zone of said injected fuel.

2. An ignition system for a stratified charge internal combustion engine, said engine having at least one combustion chamber subject to high airflow transfer motion of an inducted air supply during the compression cycle, the system comprising:

(a) walls defining a plasma ionizing chamber having an outlet orifice;

(b) electrical discharge means effective to apply a high energy electrical discharge of at least 200 millijoules for at least two seconds across the plasma ionizing chamber causing the contents thereof to be shock heated to an ionized condition and sonically released through said outlet orifice as a jet;

(c) walls defining a shock wave chamber to receive said sonically released jet, said shock wave chamber extending into said one combustion chamber and having openings aligned with said airflow transfer motion;

(d) fuel injection means effective to inject a conical pattern of comminuted fuel into said shock wave chamber; and (e) means interrupting said outlet orifice in a manner to form the release of said plasma jet into a hollow cone intersecting with the injected pattern of said fuel.

3. An ignition system as in claim 2, in which the orifice of said plasma ionizing chamber has a diameter of about 0.48-0.52", and said means interrupting said orifice is defined as an inert conical insert having a conical base centered within the orifice and having a diameter of about 0.44-0.48".

4. An ignition system as in claim 3, in which the axes of said conical insert and said conical fuel pattern intersect with an included angle of 15°-40°.

5. The ignition system as in claim 2, in which said electrical discharge means has two electrodes, and said means interrupting said orifice comprises an inert conical insert having an axis coincident with one of said electrodes, the other of said electrodes being spaced from said one electrode an axial distance of at least 0.100".

6. The system as in claim 5, in which said one electrode is an annular member surrounding the base of said insert.

7. The method as in claim 6, in which said gap across which the electrical discharge takes place is formed by an annular electrode and a central rod electode, said electrodes being spaced apart an axial distance of at least 0.100", and the annular electrode having an internal diameter of 0.48-0.52".

8. A method of carrying out combustion in a stratified charge internal combustion engine, said engine having a piston and cylinder effective to define a main combustion chamber into which an air supply is inducted and at least one sonic plasma spark plug effective to selectively provide a high energy electrical discharge across a gap between electrodes to induce a plasma discharge, one of the electrodes being annular and ringing the other electrode, said engine also having a fuel injector effective to spray a pattern of comminuted fuel into a zone to be occupied by a plasma discharge, the improvement comprising:

(a) axially separating the electrodes of said plug a predetermined distance;

(b) interposing an inert guide between said electrodes and within said annular electrode to form a hollow, conically shaped plasma discharge;

(c) sending said electrical discharge across said gap to produce said conically shaped plasma discharge;

(d) controlling the fuel spray pattern to have a conical pattern complimentary to the conical shape of said plasma discharge; and (e) directing said plasma discharge to intersect and envelope the fuel spray pattern for ignition.

9. The method as in claim 8, in which both said injection of said fuel spray pattern and the release of the plasma discharge take place during compression of an inducted air supply into said variable volume space leaving a high transfer motion, said transfer motion consisting of the resultant vector of a swirling motion about the axis of said cylinder and a radially inward squish motion resulting from movement of the piston during compression.

10. The method as in claim 9, in which said piston has a cavity in the top face thereof defining a main combustion chamber, said jet and fuel spray being directed into said main chamber during a later stage of compression.

11. The method as in claim 9, in which said conical fuel spray pattern and release of the plasma discharge is carried out within an intermediate chamber, said intermediate chamber projecting into said main combustion chamber when the piston is substantially at a top dead center position, the intermediate chamber having an entrance and exit aligned with transfer motion of said inducted air supply.

12. A method of carrying out combustion in an internal combustion engine, said engine having a piston and cylinder effective to define a variable volume space and a main combustion chamber residing as a cavity in the top face of the piston in communication with the variable volume space, said engine having walls to define an intermediate chamber and to segregate a portion of the variable volume space, said intermediate chamber projecting into said main combustion chamber when the piston is substanally at top dead center, said intermediate chamber having an entrance and an exit aligned with the predetermined circulatory path of gases in said space, the steps comprising:

(a) inducting air into said variable volume space with a swirling motion about the axis of said cylinder;

(b) compressing the air within said variable volume space and imparting a high radially inwardly squish motion to the air therein as said piston progressively approaches top dead center, said swirling motion and squish motion combining to define a circulatory path having a transfer motion from said variable volume space into said main combustion chamber defining a central air column which exits from said main combustion chamber along the sides thereof;

(c) generating a sonic plasma jet having an energy level of at least 200 millijoules and directing said jet through said intermediate chamber so as to penetrate the exit thereof and extend into said main combustion chamber, said plasma jet having a conical pattern formed by interposing an inert guide within the release orifice; and (d) injecting a conical fuel spray pattern into said intermediate chamber while said plasma jet is resident therein, the axes of said conical spray pattern and conical plasma jet intersecting with a included angle of about 15°-40°.

* * * * *